United States Patent
Collins

(10) Patent No.: US 8,386,122 B1
(45) Date of Patent: Feb. 26, 2013

(54) TECHNIQUES FOR AUTONOMOUS TESTING OF HEAD-OF-TRAIN AND/OR END-OF-TRAIN DEVICES

(75) Inventor: Jonathan A. Collins, Douglasville, GA (US)

(73) Assignee: Norfolk Southern Corporation, Norfolk, VA (US)

( * ) Notice: Subject to any disclaimer, the term of this patent is extended or adjusted under 35 U.S.C. 154(b) by 352 days.

(21) Appl. No.: 12/777,354

(22) Filed: May 11, 2010

(51) Int. Cl.
    *G01M 17/00* (2006.01)
(52) U.S. Cl. .................................... 701/31.1
(58) Field of Classification Search ............ 701/31, 701/31.1
    See application file for complete search history.

(56) References Cited

U.S. PATENT DOCUMENTS

| | | | |
|---|---|---|---|
| 5,817,934 A | 10/1998 | Skantar | |
| 5,866,811 A | 2/1999 | Skantar | |
| 6,227,625 B1 | 5/2001 | Gaughan | |
| 6,236,936 B1 | 5/2001 | Berstis et al. | |
| 7,035,240 B1 | 4/2006 | Balakrishnan et al. | |
| 7,319,397 B2 | 1/2008 | Chung et al. | |
| 7,403,744 B2 | 7/2008 | Bridgelall | |
| 7,525,420 B2 | 4/2009 | McKinney | |
| 7,528,711 B2 | 5/2009 | Kates | |
| 7,630,348 B2 | 12/2009 | Kim | |
| 7,653,386 B2 | 1/2010 | Bennett | |
| 7,653,465 B1 | 1/2010 | Geiger et al. | |

OTHER PUBLICATIONS

R. McGonigal, "End-of-Train Devices, Bringing up the Rear," TRAINS Magazine, May 1, 2006.

*Primary Examiner* — Eric Culbreth
(74) *Attorney, Agent, or Firm* — Goodwin Procter LLP

(57) ABSTRACT

Embodiments of techniques for autonomous testing of head-of-train (HOT) and/or end-of-train (EOT) devices are disclosed. In one embodiment, a method for autonomous testing of HOT and EOT devices may include the steps of: causing a first device to enter a self-test mode, said first device being either an HOT device or an EOT device mounted to a first railway vehicle; transmitting, from said first device, a test signal to elicit one or more response signals from at least one second device within a communication range of said first device, each of said at least one second device being either an HOT device or an EOT device different from said first device; detecting, by said first device, said one or more response signals, if any; and determining a first operating condition concerning said first device based at least in part on the detection of said one or more response signals.

50 Claims, 5 Drawing Sheets

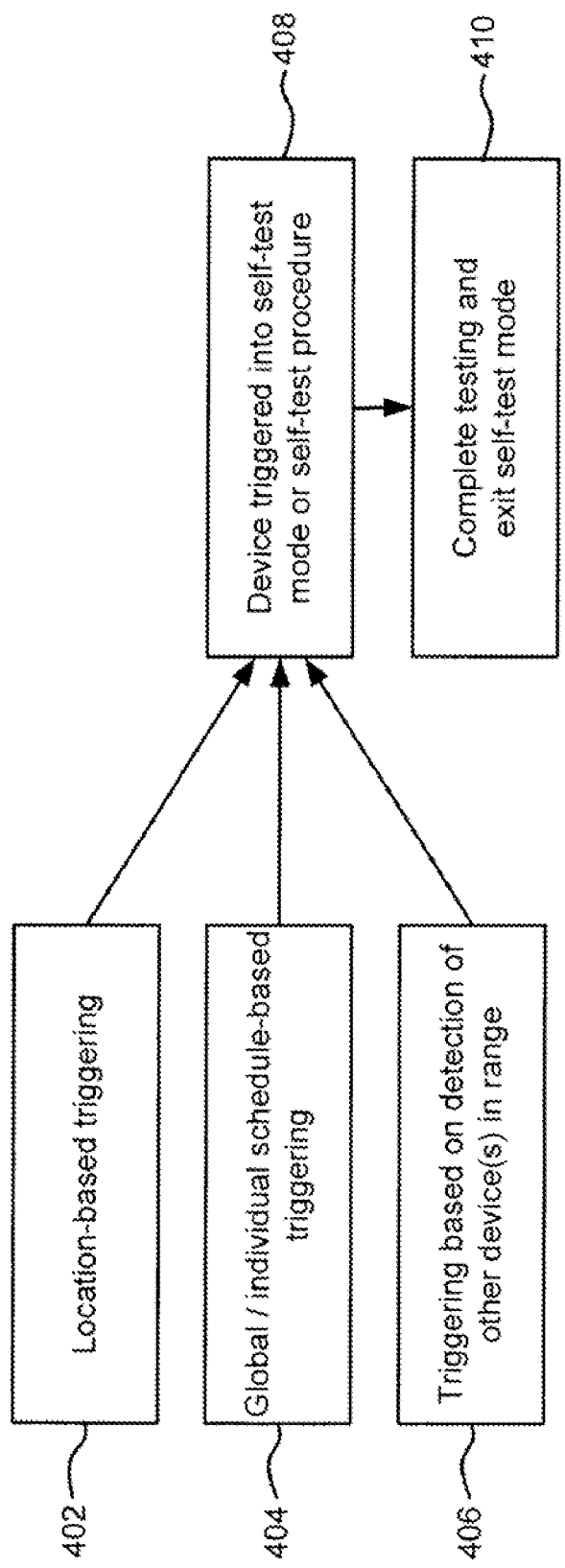

TECHNIQUES FOR AUTONOMOUS TESTING OF HEAD-OF-TRAIN AND/OR END-OF-TRAIN DEVICES

FIELD OF THE INVENTION

The present invention relates generally to railway operations and wireless telecommunications. More particularly, the present invention relates to techniques for autonomous testing of head-of-train (HOT) and/or end-of-train (EOT) devices.

BACKGROUND OF THE INVENTION

On almost every North American freight train, an end-of-train (EOT) device, also known as EOTD, ETD, or FRED (flashing rear-end device), has now replaced a caboose to perform various important functions. The EOT device is typically mounted on the back of the last car and includes a battery-operated tail-light as well as electronic equipment for other safety-related functions. For example, one significant function of an EOT device is to monitor the brake-pipe pressure. A sensor may extend from the EOT device and attach to the end of an air hose to gather data on the brake-line pressure, which is one of the most crucial measurements on any train. The brake-line pressure information is transmitted by radio messages from the EOT device to the engine cab, which may be equipped with a head-of-train (HOT) device to receive, decode, and display the data. Thus, a train engineer or driver can monitor the integrity of the brake line as he sets and releases the brakes. By receiving instructions from the HOT device via radio transmissions, the EOT device may also assist in emergency braking when necessary. EOT devices may be further equipped with motion sensors or positioning capabilities to determine the motion and/or location of the rear end of a train. For example, many EOT devices now include GPS (the Global Positioning System) receivers that pinpoint their own coordinates. Via radio transmissions, an EOT device can inform the engine cab (i.e., the corresponding HOT device) if the rear end of the train is stopped or moving forward or backward. Radio messages from the EOT device to the HOT device may also include other information such as the ON/OFF status of the red tail-light and its battery charge state.

It can be appreciated from the above introduction that it is critically important for an HOT device and an EOT device on a train to function and to communicate with each other properly. Indeed, railway regulations mandate proper two-way communications between HOT and EOT devices. Prior to the operation of a train, a pair of HOT and EOT devices should be matched up through an arming procedure. Currently, every EOT device is configured to only respond to a matched HOT device and to ignore messages received from all other EOT devices and non-matched HOT devices.

On a given freight train, the HOT and EOT devices exchange messages on a pair of radio channels (duplex), that is, with the LOT device transmitting on a first channel and listening on a second channel and with the HOT device transmitting on the second channel and listening on the first channel. For example, EOT devices may transmit on 457.9375 MHz and receive on 452.9375 MHz, while HOT devices may transmit on 452.9375 MHz and receive on 457.9375 MHz. According to some implementation, message duration of EOT and HOT devices is about 150 ms. A message from an HOT device is supposed to elicit a response from a matched EOT device, which response should start within 18 ms of the end of the HOT message.

In reality, however, EOT and HOT devices do not always operate as intended. Railroads have always had some level of trouble with EOT and HOT equipment. Before a train departs, a user may experience problem linking an HOT device with a corresponding EOT device, whereupon a new device is often attempted, followed by another device, until successful linking is achieved and the train departs. An HOT or EOT device found defective on one train in some cases may somehow work effectively on another shorter train. During train operations, communications between a pair of EOT and HOT devices can still become spotty or non-existent as a result of power failure, hardware malfunction, and/or software errors.

It is therefore desirable to test HOT and EOT devices in order to reduce their failure rate during train operations. A number of testers have been developed for HOT and LOT devices. For example, a bench mounted field tester was implemented for manual testing of HOT and EOT equipment on a preparation bench or even while in place on a train. The tester communicates with an HOT or EOT device to be tested and measures signals from the tested device to determine parameters such as center frequency, deviation, and relative signal strength. However, a correct interpretation of the measurement data to ascertain a valid pass/fail condition is very difficult. The signal strength indication is relative and requires a great deal of subjectivity in its interpretation, which is a non-trivial task even for an expert. Testing is currently limited to a point-to-point setup between the tester and the tested EOT/HOT device at a fixed distance. Other portable two-way field testers have also been developed to elicit operational data from EOT devices. Such field testers can communicate with and test only one EOT device at a time, and the testing still involves substantial manual reading and interpretation of measurement data. In summary, the existing approaches for EOT/HOT testing are ineffective, inefficient, and unreliable.

In view of the foregoing, it may be understood that there are significant problems and shortcomings associated with current testing techniques for the EOT and/or HOT devices.

SUMMARY OF THE INVENTION

Embodiments of techniques for autonomous testing of head-of-train (HOT) and/or end-of-train (EOT) devices are disclosed. In one particular embodiment, a method for autonomous testing of HOT and EOT devices may include the steps of: causing a first device to enter a self-test mode, said first device being either an HOT device or an EOT device mounted to a first railway vehicle; transmitting, from said first device, a test signal to elicit one or more response signals from at least one second device within a communication range of said first device, each of said at least one second device being either an HOT device or an EOT device different from said first device; detecting, by said first device, said one or more response signals, if any; and determining a first operating condition concerning said first device based at least in part on the detection of said one or more response signals.

In another embodiment, a system for autonomous testing of HOT and/or EOT devices may include: a first device comprising a processor and a radio transceiver, said first device being either an HOT device or an EOT device mounted to a first railway vehicle; at least one second device within a communication range of said first device, each of said at least one one second device being either an HOT device or an EOT device different from said first device. The first device may be configured to perform the following when in a self-test mode: transmitting a test signal to elicit one or more response signals from said at least one second device, detecting said one or more response signals, if any, and determining a first operating condition concerning said first device based at least in part on the detection of said one or more response signals.

In yet another embodiment, a computer readable medium storing computer readable code for autonomous testing of HOT and/or EOT devices may include: code for causing a first device to enter a self-test mode, said first device being either an HOT device or an EOT device mounted to a first railway vehicle; code for transmitting, from said first device, a test signal to elicit one or more response signals from at least one second device within a communication range of said first device, each of said at least one second device being either an HOT device or an EOT device different from said first device; code for detecting, by said first device, said one or more response signals, if any; and code for determining a first operating condition concerning said first device based at least in part on the detection of said one or more response signals.

The present invention will now be described in more detail with reference to exemplary embodiments thereof as shown in the accompanying drawings. While the present invention is described below with reference to exemplary embodiments, it should be understood that the present invention is not limited thereto. Those of ordinary skill in the art having access to the teachings herein will recognize additional implementations, modifications, and embodiments, as well as other fields of use, which are within the scope of the present invention as described herein, and with respect to which the present invention may be of significant utility.

BRIEF DESCRIPTION OF THE DRAWINGS

In order to facilitate a fuller understanding of the present invention, reference is now made to the accompanying drawings, in which like elements are referenced with like numerals. These drawings should not be construed as limiting the present invention, but are intended to be exemplary only.

FIG. 4 shows a flow chart illustrating exemplary triggering mechanisms for autonomous testing of HOT and/or EOT devices in accordance with embodiments of the present invention.

DETAILED DESCRIPTION OF THE INVENTION

Embodiments of the present invention provide for a variety of techniques for autonomous testing of HOT and/or EOT devices. Rather than the prior approach of performing manual, fixed-distance tests, HOT and EOT devices may be programmed to proactively and autonomously test themselves against one another and then record/report the testing results. Each HOT or EOT device may, upon discovering one or more other HOT or EOT devices, test itself against the other devices by communicating with them. Through such communications, which may include measurement of signal data, a device may determine its own operating condition as well as gaining knowledge of the health of the other device(s) with which it has communicated.

Other features and advantages of the present invention may be appreciated from the following illustration and description.

Figure 1:
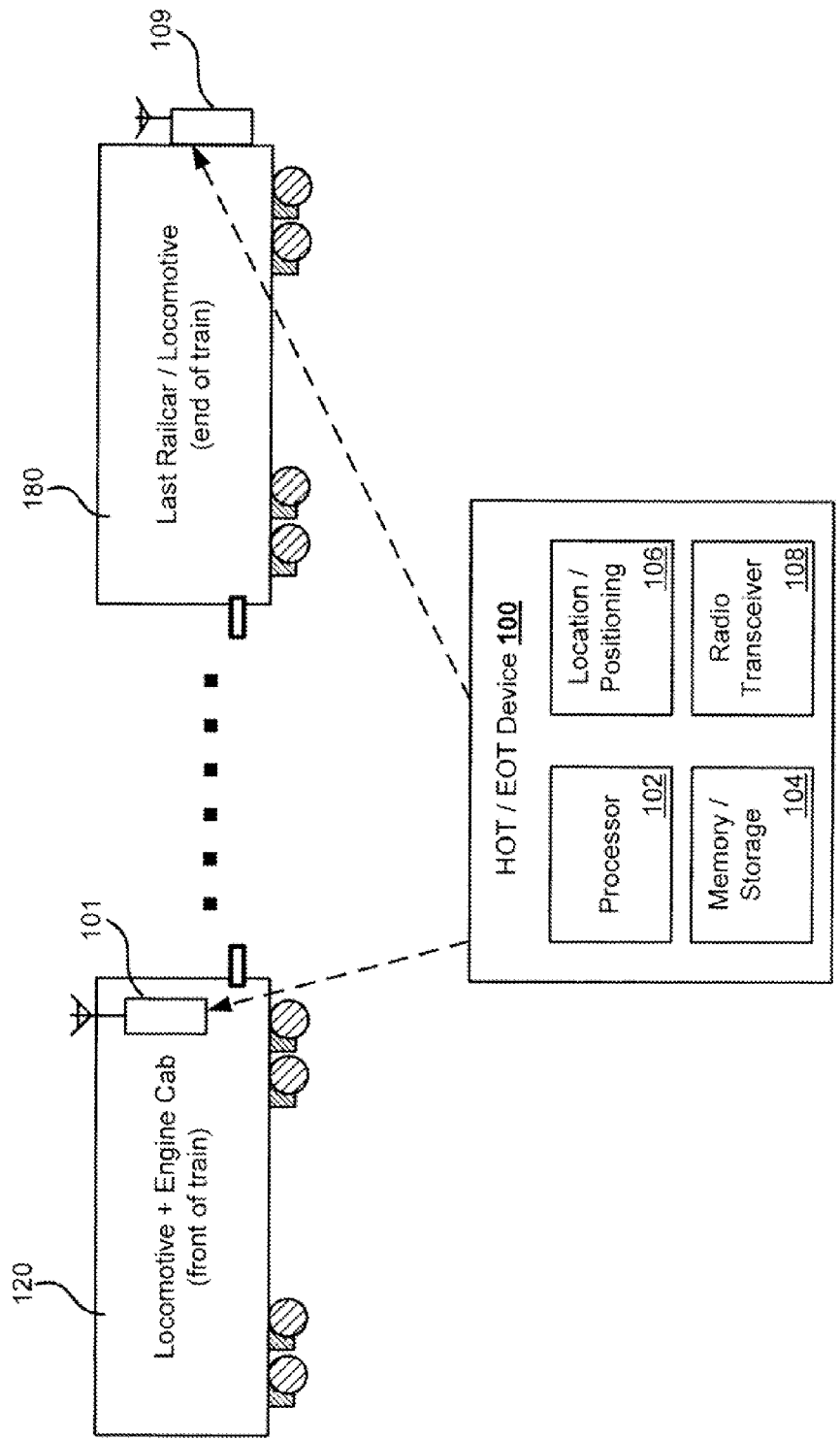
FIG. 1 shows a block diagram illustrating an exemplary HOT or EOT device 100 in accordance with an embodiment of the present invention.

Referring to FIG. 1, there is shown a block diagram illustrating an exemplary HOT or EOT device 100 in accordance with an embodiment of the present invention. The device 100 may be any type of commercially available or proprietary HOT or EOT device. For example, the device 100 may be implemented as an HOT device 101 mounted to a locomotive or engine cab 120 located at or towards the front of a train. Alternatively, the device 100 may be implemented as an EOT device 109 mounted to a last car or locomotive 180 located at or towards the end of a train.

The device 100 may comprise at least a processor 102, a memory/storage module 104, and a radio transceiver 108. The processor 102 may be a central processing unit (CPU), a microcontroller unit, or other digital processing device, which is preferably reprogrammable with both its usual operating instructions and self-testing instructions. The processor 102 may also be or comprise an application-specific integrated circuit (ASIC) chip that is pre-configured to perform desired functions. The memory/storage module 104, coupled to the processor 102 and the radio transceiver 108 for their data storage and/or buffering needs, may include volatile and/or non-volatile storage units. The radio transceiver 108 may have multi-channel capabilities to facilitate two-way communications with one or more other devices. According to one embodiment of the present invention, the radio transceiver 108 may be a DATARADIO® JSLM2™ telemetry radio available from CalAmp Corporation, which is a 16-channel radio capable of 2-5 W transmission power. By communicating with other devices, or simply broadcasting a beacon signal, for example, the device 100 may make its presence known to other HOT or EOT devices.

The device 100 may further (optionally) comprise a location/positioning module 106, such as a global positioning system (GPS) unit or the like. With the location/positioning module 106, the device 100 can determine its current relative or absolute location (e.g., distance from a reference point or Lat/Long coordinates). The location information may, according to some embodiments, be constantly or periodically broadcast via radio waves, such that other devices may become aware of its current location.

Figure 2:
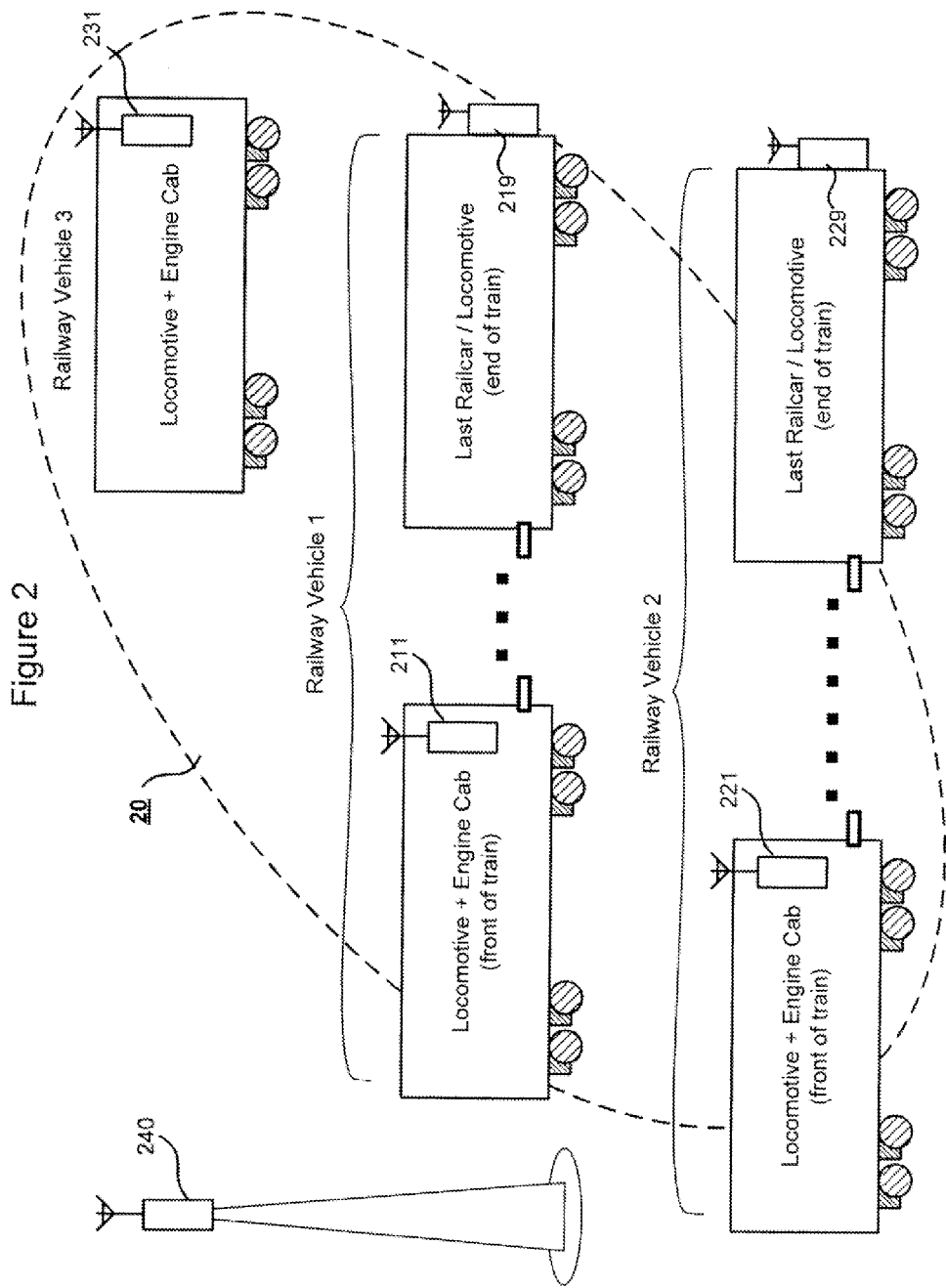
FIG. 2 illustrates a number of exemplary implementations of autonomous testing of HOT and/or EOT devices in accordance with an embodiment of the present invention.

FIG. 2 illustrates a number of exemplary implementations of autonomous testing of HOT and/or EOT devices, such as the device 100 shown in FIG. 1, in accordance with an embodiment of the present invention. As shown in FIG. 2, a number of railway vehicles, long or short and of different types, may have HOT and/or EOT devices mounted thereon that can perform autonomous self-testing. The railway vehicles can be freight trains, passenger trains, and rail yard switchers, etc. For example, Railway Vehicle 1 may be a relatively short train on which an HOT device 211 and an EOT device 219 are mounted. Railway Vehicle 2 may be a relatively long train on which an HOT device 221 and an EOT device 229 are mounted. Railway Vehicle 3 may be a single-locomotive switcher that has an HOT device 231 mounted thereon.

According to some embodiments of the present invention, the HOT and/or EOT devices on these railway vehicles may be programmed to enter into a self-test mode when the vehicles are in a location where one or more other HOT or EOT devices are likely to be present, such as in or near a railroad yard or a railway station. That is, the devices may enter a self-test mode either upon entering a predefined geographic area or upon detecting one or more other devices in its signaling range. For example, when Railway Vehicle 2 enters a railroad yard 20, its HOT device 221 may switch into a self-test mode automatically and start to compile a list of other HOT and/or EOT devices that are also present in the railroad yard 20 or otherwise within communication range of the HOT device 221. For another example, when an EOT device 219 on Railway Vehicle 1 detects other devices within its communication range, the EOT device 219 may enter into a self-test mode. Alternatively, each device may be programmed or configured to automatically enter a self-test mode according to a predefined schedule, such as at specific date and time or after a certain amount of time since its last successful self-test. The self-testing procedures of the devices 221 and 219 may be carried out independently or simultaneously. For case of illustration, the following description will only focus on the self-testing of the EOT device 219 although the same or similar procedure can be implemented by any other EOT or HOT device.

In a preferred embodiment of the present invention, a device in self-test mode, such as the EOT device 219, may learn the locations of the other HOT and/or EOT devices, for example, by receiving their broadcasted coordinates. Optionally, the broadcasted messages from some or all of the other devices may also include additional information such as each device's own operating condition (if known) and/or data concerning signals (e.g., signal strength) initially transmitted from each device. It should be noted that, previously, an HOT or EOT device only reads messages from its paired EOT or HOT device and is typically programmed to ignore or discard messages from all other devices that have not been paired with the receiving device. According to the present invention, however, an HOT or EOT device in a self-test mode are configured to read messages from and/or to respond to any device regardless of whether they have been paired with each other.

As one part of the self-testing procedure, the EOT device 219 may diagnose its own signal-receiving capabilities or conditions by simply listening to and processing messages transmitted or broadcasted by other devices.

As a very basic test, the EOT device 219 may determine whether its radio receiver can detect signals from other devices and retrieve message data from the detected signals. If a general message format is known or predefined for the other devices, the EOT device 219 may at least check the received messages against the known format to determine the integrity of the message data. This way, even if the EOT device 219 does not know the transmitting conditions of the other devices, it could still generally determine whether it is receiving signals and parsing messages properly. According to one embodiment of the present invention, the EOT device 219 may receive and process signals from a number of different devices and then determine its own receiving capabilities based on a statistical analysis of the results from processing the signals from these different sources. For example, while a couple of the other devices from which the EOT device 219 receives signals might not have transmitted signals correctly in the first place, these poor signals would not necessarily cause the EOT device 219 to believe its own signal-receiving component is malfunctioning if it is determined that it could properly receive signals from a few more other devices. Of course, the statistical analysis of the receiving results could also lead the EOT device 219 to assign a probability to its conclusion of its signal-receiving conditions. For example, if only signals from one out of ten other devices received are garbled, the EOT device 219 may conclude that there is a 90% chance its signal-receiving component is functioning properly.

In a more advanced implementation, the EOT device 219 may conduct measurements of the signals received from each of the other devices, calculate a distance between itself and such other device, and then determine whether it is receiving the signals properly based on the signal measurement and the distance. For example, from the broadcasted coordinates of a transmitting device and its own coordinates, the EOT device 219 can calculate a relative distance from that device, determine what the signal parameters are supposed to be after traveling the distance, and compare measurement of the actually received signals against such signal parameters. Even more ideally, if the transmitting device has included in the messages some measurement data of the signals as initially transmitted (e.g., transmitting power and frequency), the EOT device 219 may take advantage of such measurement data by further checking the measurement of the received signals against such data.

At the same time, when the LOT device 219 is testing its own signal-receiving conditions, it may also gain information concerning the transmitting conditions of the other devices from which it has received signals. Such knowledge of the other devices' performance or health may be recorded by the EOT device 219 and/or recorded to or shared with other devices or a management network of the railway company.

According to other embodiments of the present invention, the HOT and/or EOT devices on these railway vehicles may be programmed to test themselves against one or more other devices which may be mounted in fixed and/or mobile locations, such as in or near a railroad yard, in or near a railway station, and/or along any portion of a railroad. For example, in FIG. 2, a device 240, which may be an HOT or EOT device or the equivalent, may be mounted to a tower or pole in one of the above-mentioned locations. All compatible HOT or EOT devices may be pre-informed of the identity, location, and/or transmitting conditions of the device 240, such that those devices can test themselves against the device 240 when they come within its signaling range. According to one embodiment of the present invention, the device 240 may serve as a dedicated testing reference device and/or present itself as either an HOT or EOT device to the other devices in the vicinity. According to an alternatively embodiment, the device 240 may serve as both a testing reference device and a radio signal repeater. The signal-repeater portion of the device 240 may be constantly on or it may kick in when it senses attenuation of signals from a particular device.

As another part of the self-testing procedure, the EOT device 219 may diagnose its own signal-transmitting capabilities or conditions by communicating with one or more other HOT or EOT devices (e.g., 211, 221, 229, 231) or the device 240 and the like. In general, the EOT device 219 may start by transmitting or broadcasting a test signal to the other device(s) to elicit response signals. Simply by successfully transmitting the test signal, the EOT device 219 may have a basic understanding of its transmitting condition. Based on the fact that at least one response signal is received as elicited, as well as any additional information included in the response signal(s), the EOT device 219 may gain more knowledge of its own transmitting condition (and the receiving and transmitting conditions of a device that has responded to the test signal).

According to one embodiment of the present invention, the test signal from the EOT device 219 may be a basic analog or digital signal which the other devices have been programmed to recognize and respond to. As mentioned earlier, the previous practice where each HOT or EOT device was programmed to discard or ignore messages from all other devices than the one with which it has been paired. According to the present invention, each HOT or EOT device can be programmed to always or selectively respond to test signals from other devices, regardless of whether they are HOT or EOT devices or whether they have been specifically paired with the device issuing the test signals. The response signal may be a simple acknowledgement of receipt, or it may include additional data that can assist the EOT device 219 to determine its transmitting and/or receiving conditions.

According to another embodiment of the present invention, the test signal from the EOT device 219 may include a message with a test request and/or specific instruction(s) on how the other device should respond. For example, the test request and/or instruction(s) may cause the responding device to measure the signals received from the EOT device 219 and then send the measurement data back to the EOT device 219. For another example, the test request and/or instruction(s) may cause the responding device to extract a piece of data from a message embedded in the test signal and report back the extracted data or data derived therefrom. Or, the test message may cause the responding device to perform error checking on the test message and/or the test signal waveform(s) and then report back the error-checking results. Of course, the responding device may alternatively be pre-programmed to perform the various measurement and response functions without specific instructions from the EOT device 219.

By eliciting a response signal, be it a simple acknowledgement or a measurement report, the EOT device 219 can then determine whether its signal-transmitting component is functioning properly. Similar to the self-testing of its signal-receiving component, the EOT device 219 may perform communication checks with multiple other devices and determine its own signal-receiving condition based on a statistical analysis of the results from the multiple responding devices. Also, the process inherently allows the EOT device 219 to learn the signal-transmitting and/or signal-receiving conditions of each of the responding devices. In other words, by causing the devices to communicate with one another in individual self-tests which also amount to a collective group test, a wealth of testing data may be generated that reflect the current operating conditions of those devices.

The above-described autonomous self-testing may be performed against the other devices either sequentially or simultaneously (e.g., via different communication channels). Furthermore, not all device need to be pre-programmed with the autonomous testing procedures in order to participate in the self-testing or group testing. That is, some legacy devices may be at least partially tested when their transmitted signals can be heard by other devices. In order to be fully tested, some legacy devices only need to be programmed or configured to provide at least some response upon receiving a test signal. Alternatively, some legacy devices that only respond to their paired devices (e.g., a legacy EOT device only responds to its paired HOT device and vice versa) could be fooled into responding to an un-paired device if that device could present itself in communicating with that legacy device. For instance, if it is known that a legacy device A will only respond to messages that include a unique identifier of its paired device B (this information could be known to the railway management network), another device C may test itself and/or the legacy device A by mimicking the paired device B by including B's identifier in a test message transmitted to A.

Any of the self-test results and/or the testing results of other device(s) can be recorded in a memory/storage unit in the EOT device 219. The EOT device 219 may additionally or alternatively broadcast such results to other devices and/or report the results to the railway management network or other central data repository. Or, a device's test results may be shared with or displayed to all users who encounter the device and try to use it. For example, the EOT device 219 may communicate with one or more central computer via direct wireless data links or via a cellular network. Such testing and self-testing, coupled with data sharing among the devices and with a central control, may be beneficial for identifying and/or locating failed, failing, or misplaced HOT or EOT equipment. The testing data, which may also include location information of the tested or self-tested devices, may also facilitate a number of other purposes such as tracking the railway vehicles to which those devices are mounted or supposed to be mounted and confirming whether the vehicles have adhered to their respective schedules. According to a further embodiment of the present invention, various messages (e.g., news, alerts, warnings, software updates) may be distributed to the HOT and/or EOT devices via peer-to-peer communications, such as being relayed from one device to another in connection with, or independent of, the above-described self-testing procedures.

Depending on the test results obtained, the EOT device 219 may take further action(s) to improve communications of or among the HOT and/or EOT devices. For example, the EOT device 219 may identify another device that is currently in an RF shadow and start acting as a signal repeater for that device for as long as necessary or feasible.

Figure 3:
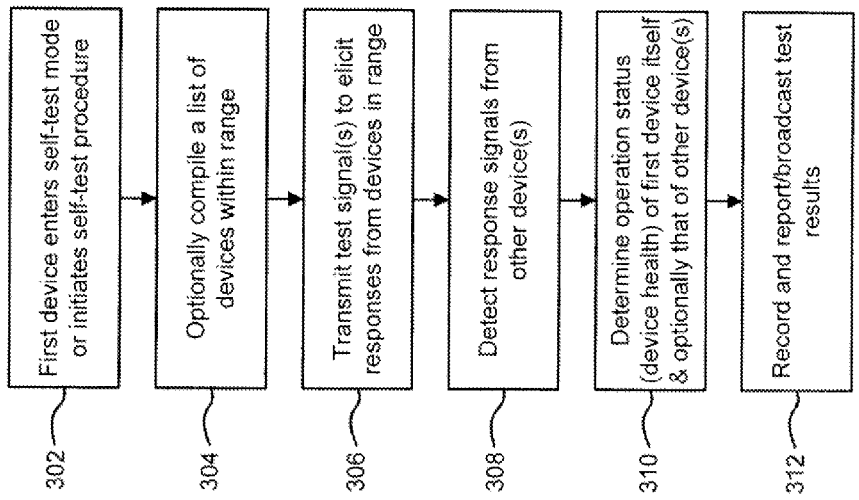
FIG. 3 shows a flow chart illustrating an exemplary method for autonomous testing of HOT and/or EOT devices in accordance with an embodiment of the present invention.

FIG. 3 shows a flow chart illustrating an exemplary method for autonomous testing of HOT and/or EOT devices in accordance with an embodiment of the present invention.

In step 302, a first device enters a self-test mode or initiates a self-test procedure. The first device may be either an HOT or EOT device, and it may be mounted to a railway vehicle or positioned somewhere else.

As illustrated in FIG. 4, one or more triggering mechanisms may cause a device to enter a self-test mode or procedure. For example, the device may be programmed or configured to respond to location-based triggering (step 402), wherein the device is aware of its current location at all times and can enter self-test as soon as it finds itself in a predefined geographic location such as a railroad yard or railway station. The device may additionally or alternatively be programmed to respond to schedule-based triggering (step 404). For example, the device may be set up for self-testing at specific date and/or time (e.g., certain time of the day, certain day(s) in a week/month) or according to a more flexible time table or based on a minimal testing frequency requirement. Or, according to other embodiments, the device may be programmed to respond to triggering based on detection of other device(s) in its signaling range (step 406). For example, the device may start testing against another device as soon as they come within range of each other, for example, along a stretch of a railroad. Alternatively, the device may be programmed to start self-testing only after it detects a minimum number of devices in its signaling range, which may effectively limit the triggering to certain locations where other HOT and/or EOT devices are concentrated such as a railroad yard or railway station. After the device is triggered into self-testing (step 408), it may complete the self-testing procedure and/or the testing of other devices and then exit the self-test mode (step 410) as described herein in connection with FIGS. 2, 3, and 5.

Referring again to FIG. 3, in step 304, the first device may start by optionally compiling a list of devices within its signaling range or communication range. This step may have already been completed if the first device were triggered into self-testing by detection of other device(s). Otherwise, the first device may detect the presence of the other devices by receiving signals from the other devices and/or reading location data included in messages from those devices. The compiled list may provide candidates with which the first device can perform peer-to-peer testing and self-testing as it may not be necessary to test with all the devices nearby. For example, it may be beneficial for the first device to select a few nearby devices that are located some different distances away from the first device, such that the first device may test itself and/or others for signal-transmission and/or signal-receiving over various distances.

In step 306, the first device may transmit one or more test signals to elicit responses from other devices within signaling range. Apart from the type or content of test signals described above and in FIG. 5A, the first device may also employ a series of test signals, for example, of varying duration, frequencies, strengths, and/or message content. For instance, the first device may transmit test signals of progressively weaker strengths and elicit acknowledgement from a responding device until no more acknowledgement is received, which test could, among other things, measure an effective signal transmission range. Alternatively, the first device may progressively increase its transmission power of the test signals if a responding device is traveling away from the first device. Of course, the test signals may be kept steady and the first device can test for a maximum distance at which a response signal is lost.

In step 308, the first device detects and/or measures response signals from other device(s). A number of parameters concerning the response signals may be measured, including but not limited to center frequency, frequency deviation, waveforms, and signal strength.

In step 310, the first device determines its own operation condition/status (e.g., device health) and/or that of other responding device(s) based on the response signal(s) detected and/or measured. In an alternative embodiment of the present invention, the measurement data collected in step 308 may be forwarded to a third-party device such as a central computer in the railway management or communications network for processing to determine the operating condition of the first device.

Then, in step 312, the test results obtained can be recorded by the first device and it may broadcast the results (or conclusions) to other devices and/or report them to the railway company's management network or a central computer.

Figure 5A:
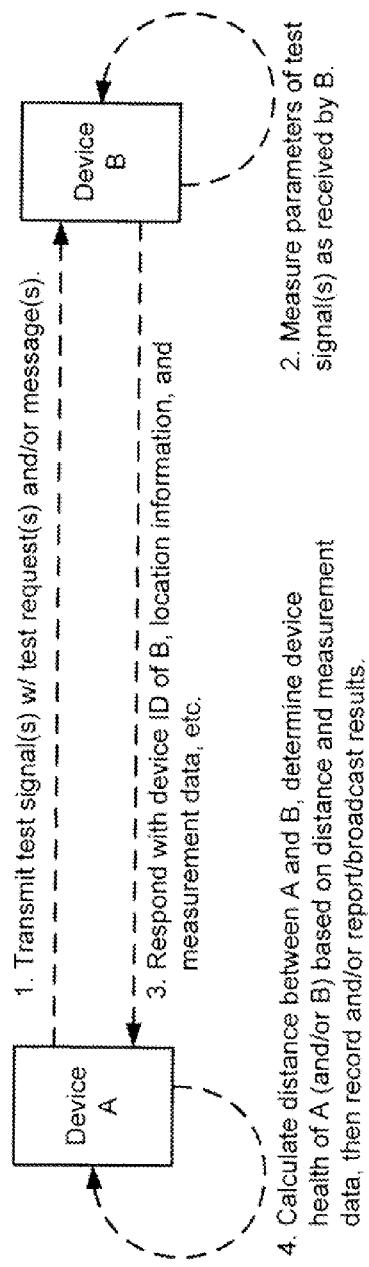
FIGS. 5A and 5B show flow diagrams illustrating alternative methods for autonomous testing of HOT and/or EOT devices in accordance with an embodiment of the present invention.
Figure 5B:
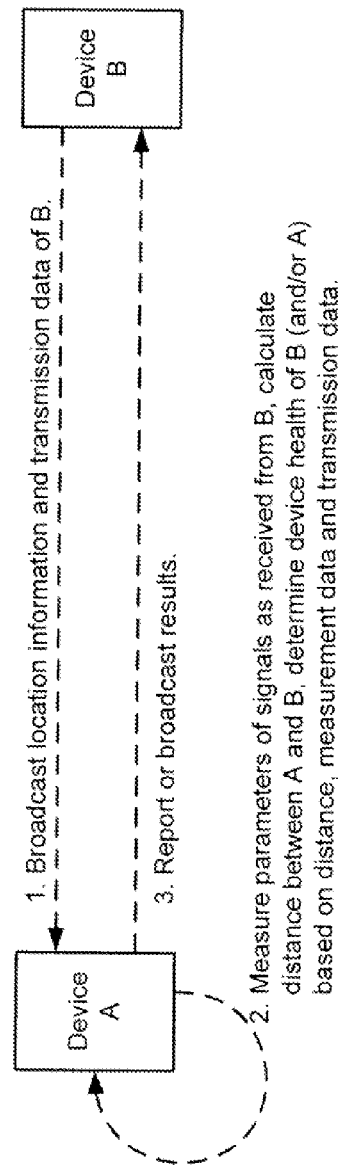

FIGS. 5A and 5B show flow diagrams illustrating alternative methods for autonomous testing of HOT and/or EOT devices in accordance with an embodiment of the present invention. FIG. 5A illustrates, in a self-explanatory manner, how Device A proceeds to test itself (and/or B) against Device B. FIG. 5B, on the other hand, illustrates how Device A tests Device B (and/or A) based on its broadcasted signals and reports the test results back to Device B.

At this point, it should be noted that, although the techniques in accordance with the present invention have been described here primarily in the context of railway transportation, the practical application of the present invention is not necessarily limited to the testing of HOT and/or EOT devices. Those skilled in the art can appreciate that embodiments of the present invention can be adapted for the autonomous testing of other wireless communication devices. For example, the techniques disclosed herein may be similarly employed to test communication devices used in fleet management by trucking companies.

While the foregoing description includes many details and specificities, it is to be understood that these have been included for purposes of explanation only, and are not to be interpreted as limitations of the present invention. It will be apparent to those skilled in the art that other modifications to the embodiments described above can be made without departing from the spirit and scope of the invention. Accordingly, such modifications are considered within the scope of the invention as intended to be encompassed by the following claims and their legal equivalents.

The invention claimed is:

1. A method for autonomous testing of head-of-train (HOT) or end-of-train (EOT) devices, the method comprising:
    causing a first device to enter a self-test mode, said first device being either an HOT device or an EOT device mounted to a first railway vehicle;
    transmitting, from said first device, a test signal to elicit one or more response signals from at least one second device within a communication range of said first device, each of said at least one second device being either an HOT device or an EOT device different from said first device, wherein said at least one second device is not previously paired to said first device;
    detecting, by said first device, said one or more response signals, if any; and
    determining a first operating condition concerning said first device based at least in part on the detection of said one or more response signals.

2. The method according to claim 1, wherein said at least one second device is mounted to at least one second railway vehicle.

3. The method according to claim 2, further comprising:
    causing said first device to test itself against said at least one second device when said first railway vehicle and said at least one second railway vehicle are both in or near a railroad yard or a railway station.

4. The method according to claim 1, wherein said at least one second device is mounted in one or more fixed or mobile locations selected from a group consisting of: (1) in or near a railroad yard, (2) in or near a railway station, and (3) along any portion of a railroad.

5. The method according to claim 4, further comprising:
    causing said first device to test itself against said at least one second device when said first railway vehicle comes within a signaling range of said one or more fixed or mobile locations.

6. The method according to claim 1, wherein said first device is an EOT device and it presents itself as an HOT device in transmitting said test signal.

7. The method according to claim 1, wherein said at least one second device comprises two or more EOT or HOT devices that are not previously paired with said first device.

8. The method according to claim 1, wherein said first device automatically enters said self-test mode based upon a predetermined schedule or a predetermined triggering condition.

9. The method according to claim 1, wherein said first device enters said self-test mode after detecting said at least one second device within said communication range of said first device.

10. The method according to claim 1, further comprising:
    detecting presence of said at least one second device within said communication range by sensing signals broadcasted by said at least one second device.

11. The method according to claim 10, further comprising:
    compiling a list of said at least one second device detected within said communication range.

12. The method according to claim 1, wherein said one or more response signals include data concerning said test signal as measured by said at least one second device.

13. The method according to claim 12, wherein said measured data comprise one or more of the following parameters concerning said test signal: (1) frequency, (2) frequency deviation, or (3) signal strength.

14. The method according to claim 1, wherein said one or more response signals include data retrieved or derived from said test signal as received by said at least one second device.

15. The method according to claim 14, wherein said data include at least a portion of a message content in said test signal as received by said at least one second device.

16. The method according to claim 1, wherein said one or more response signals include location information of said at least one second device or said at least one second device broadcasts said location information.

17. The method according to claim 16, further comprising:
determining a distance between said first device and said at least one second device based on said location information.

18. The method according to claim 17, further comprising:
determining said first operating condition of said first device based at least in part on said distance.

19. The method according to claim 17, further comprising:
retransmitting, by said first device, at least some of signals transmitted by said at least one second device if said distance is at least a predetermined length, thereby causing said first device to serve as a signal repeater for said at least one second device.

20. The method according to claim 17, further comprising:
causing said at least one second device to retransmit at least some of signals transmitted by said first device if said distance is at least a predetermined length, thereby causing said at least one second device to serve as a signal repeater for said first device.

21. The method according to claim 17, further comprising:
measuring one or more parameters of said one or more response signals; and
determining a second operating condition of said at least one second device based on said measured one or more parameters and said distance.

22. The method according to claim 21, further comprising:
recording said second operating condition of said at least one second device to a storage medium or reporting or broadcasting said second operating condition via a communication interface.

23. The method according to claim 1, further comprising:
recording said first operating condition of said first device to a storage medium or reporting or broadcasting said first operating condition via a communication interface.

24. The method according to claim 1, further comprising:
determining a second operating condition of said at least one second device based on the detection of said one or more response signals; and
recording said second operating condition of said at least one second device to a storage medium or reporting or broadcasting said second operating condition via a communication interface.

25. The method according to claim 1, further comprising:
causing a plurality of devices to self-test themselves in a same method as recited in claim 1; and
collecting operating conditions of said plurality of devices.

26. A system for autonomous testing of head-of-train (HOT) or end-of-train (EOT) devices, the system comprising:
a first device comprising a processor and a radio transceiver, said first device being either an HOT device or an EOT device mounted to a first railway vehicle;
at least one second device within a communication range of said first device, each of said at least one second device being either an HOT device or an EOT device different from and not previously paired to said first device;
said first device being configured to perform the following when in a self-test mode:
transmitting a test signal to elicit one or more response signals from said at least one second device,
detecting said one or more response signals, if any; and
determining a first operating condition concerning said first device based at least in part on the detection of said one or more response signals.

27. The system according to claim 26, wherein said at least one second device is mounted to at least one second railway vehicle.

28. The system according to claim 27, wherein said first device is configured to test itself against said at least one second device when said first railway vehicle and said at least one second railway vehicle are both in or near a railroad yard or a railway station.

29. The system according to claim 26, wherein said at least one second device is mounted in one or more fixed or mobile locations selected from a group consisting of: (1) in or near a railroad yard, (2) in or near a railway station, and (3) along any portion of a railroad.

30. The system according to claim 29, wherein said first device is configured to test itself against said at least one second device when said first railway vehicle comes within a signaling range of said one or more fixed or mobile locations.

31. The method according to claim 26, wherein said first device is an EOT device and it presents itself as an HOT device in transmitting said test signal.

32. The system according to claim 26, wherein said at least one second device comprises two or more EOT or HOT devices that are not previously paired with said first device.

33. The system according to claim 26, wherein said first device is configured to automatically enter said self-test mode based upon a predetermined schedule or a predetermined triggering condition.

34. The system according to claim 26, wherein said first device is configured to enter said self-test mode after detecting said at least one second device within said communication range of said first device.

35. The system according to claim 26, wherein said first device is configured to detect presence of said at least one second device within said communication range by sensing signals broadcasted by said at least one second device.

36. The method according to claim 35, wherein said first device is configured to compile a list of said at least one second device detected within said communication range.

37. The system according to claim 26, wherein said one or more response signals include data concerning said test signal as measured by said at least one second device.

38. The method according to claim 37, wherein said measured data comprise one or more of the following parameters concerning said test signal: (1) frequency, (2) frequency deviation, or (3) signal strength.

39. The system according to claim 26, wherein said one or more response signals include data retrieved or derived from said test signal as received by said at least one second device.

40. The system according to claim 39, wherein said data include at least a portion of a message content in said test signal as received by said at least one second device.

41. The system according to claim 26, wherein said one or more response signals include location information of said at least one second device or said at least one second device broadcasts said location information.

42. The system according to claim 41, wherein said first device is further configured to determine a distance between said first device and said at least one second device based on said location information.

43. The system according to claim 42, wherein said first device is further configured to determine said first operating condition of said first device based at least in part on said distance.

44. The system according to claim 42, wherein said first device is further configured to retransmit at least some of signals transmitted by said at least one second device if said distance is at least a predetermined length, thereby causing said first device to serve as a signal repeater for said at least one second device.

45. The system according to claim 42, wherein said at least one second device is further configured to retransmit at least some of signals transmitted by said first device if said distance is at least a predetermined length, thereby causing said at least one second device to serve as a signal repeater for said first device.

46. The system according to claim 42, wherein said first device is further configured to:
measure one or more parameters of said one or more response signals; and
determine a second operating condition of said at least one second device based on said measured one or more parameters and said distance.

47. The system according to claim 46, wherein said first device is further configured to record said second operating condition of said at least one second device to a storage medium or to report or broadcast said second operating condition via a communication interface.

48. The system according to claim 26, wherein said first device is further configured to record said first operating condition of said first device to a storage medium or to report or broadcast said first operating condition via a communication interface.

49. The system according to claim 26, wherein said first device is further configured to:
determine a second operating condition of said at least one second device based on the detection of said one or more response signals; and
record said second operating condition of said at least one second device to a storage medium or report or broadcast said second operating condition via a communication interface.

50. A computer readable medium storing computer readable code for autonomous testing of head-of-train (HOT) or end-of-train (EOT) devices, the computer readable medium comprising:
code for causing a first device to enter a self-test mode, said first device being either an HOT device or an EOT device mounted to a first railway vehicle;
code for transmitting, from said first device, a test signal to elicit one or more response signals from at least one second device within a communication range of said first device, each of said at least one second device being either an HOT device or an EOT device different from said first device, wherein said at least one second device is not previously paired to said first device;
code for detecting, by said first device, said one or more response signals, if any; and
code for determining a first operating condition concerning said first device based at least in part on the detection of said one or more response signals.

* * * * *